(12) United States Patent
Takumi (10) Patent No.: US 10,831,016 B2
(45) Date of Patent: Nov. 10, 2020

(54) EYEPIECE OPTICAL SYSTEM AND OBSERVATION APPARATUS

(71) Applicant: CANON KABUSHIKI KAISHA, Tokyo (JP)

(72) Inventor: Ai Takumi, Utsunomiya (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 106 days.

(21) Appl. No.: 16/203,871

(22) Filed: Nov. 29, 2018

(65) Prior Publication Data
US 2019/0171000 A1 Jun. 6, 2019

(30) Foreign Application Priority Data

Dec. 1, 2017 (JP) ................. 2017-231519

(51) Int. Cl.
| | | |
|---|---|---|
| G02B 25/00 | (2006.01) | |
| G02B 27/00 | (2006.01) | |
| G02B 9/34 | (2006.01) | |
| H04N 5/232 | (2006.01) | |
| G02B 9/14 | (2006.01) | |
| G02B 23/14 | (2006.01) | |

(52) U.S. Cl.
CPC ............. *G02B 25/001* (2013.01); *G02B 9/14* (2013.01); *G02B 9/34* (2013.01); *G02B 23/14* (2013.01); *G02B 27/0031* (2013.01); *H04N 5/23293* (2013.01)

(58) Field of Classification Search
CPC ..................................................... G02B 25/001
USPC ................................................... 359/644, 645
See application file for complete search history.

(56) References Cited

U.S. PATENT DOCUMENTS

| | | | |
|---|---|---|---|
| 5,305,147 A | | 4/1994 | Hasegawa et al. |
| 6,104,542 A | * | 8/2000 | Omura ................. G02B 25/001 |
| | | | 359/643 |
| 2013/0188072 A1 | | 7/2013 | Hiyori |
| 2014/0340558 A1 | * | 11/2014 | Nakahara ................. G02B 9/16 |
| | | | 348/333.08 |

FOREIGN PATENT DOCUMENTS

JP 2010175795 A 8/2010

\* cited by examiner

*Primary Examiner* — Darryl J Collins
(74) *Attorney, Agent, or Firm* — Carter, DeLuca & Farrell LLP (57) ABSTRACT

The present invention provides an eyepiece optical system for observing an image displayed on an image display surface. The eyepiece optical system includes a first lens having a positive refractive power, a second lens having a negative refractive power, and a third lens having a positive refractive power, which are arranged in this order from an image display surface side to an observation side. A focal length of the first lens, a focal length of the third lens, a curvature radius of a lens surface on the observation side of the first lens, and a curvature radius of a lens surface on the image display surface side of the second lens are appropriately set.

8 Claims, 12 Drawing Sheets

EYEPIECE OPTICAL SYSTEM AND OBSERVATION APPARATUS

BACKGROUND OF THE INVENTION

Field of the Invention

The present invention relates to an eyepiece optical system and an observation apparatus.

Description of the Related Art

An eyepiece optical system has heretofore been used in an electronic viewfinder (an observation apparatus) in order to magnify and observe an image displayed on an image display element such as a liquid crystal display screen.

This eyepiece optical system is demanded to have a sufficiently wide field of view (a high observation magnification), a sufficiently long eye relief, and optical performances with successfully corrected aberrations or the like in order to improve visibility of an image display surface. In addition, the image display element used in the observation apparatus is required to have small dimensions (such as a diagonal length of 20 mm or less) to meet a demand for reduction in size of the observation apparatus.

Various eyepiece optical systems with high observation magnifications have been proposed to date. Japanese Patent Application Laid-Open No. 2010-175795 discloses an eyepiece optical system including a first lens having a positive refractive power, a second lens having a negative refractive power, and a third lens having a positive refractive power, which are arranged from an image display element side to an observation side. Meanwhile, U.S. Pat. No. 5,305,147 discloses an eyepiece lens for an endoscope consisting of a lens unit having a negative refractive power and a lens unit having a positive refractive power, and employs an aspheric surface.

In the meantime, U.S. Patent Application Publication No. 2013/0188072 discloses an eyepiece optical system consisting of a first lens having a positive refractive power, a second lens having a negative refractive power, and a third lens having a convex-shaped lens surface on an observation side and a positive refractive power, which are arranged in this order from an image display element side to the observation side. U.S. Patent Application Publication No. 2013/0188072 discloses the eyepiece optical system that has a long eye relief while retaining a high observation magnification.

In order to secure both the high observation magnification and the long eye relief in the eyepiece optical system used in the observation apparatus, it is important to appropriately set a lens configuration of the eyepiece optical system, the refractive powers of the respective lenses therein, and so forth. In addition, it is important to appropriately set a ratio of the refractive power of the eyepiece optical system to the size of the image display surface, and the like when using the image display element having a small image display surface.

In the eyepiece optical system disclosed in Japanese Patent Application Laid-Open No. 2010-175795, a coma and a distortion are successfully corrected by appropriately defining a shape between the second lens having the negative refractive power and the third lens having the positive refractive power. However, a field curvature tends to increase with an increase in magnification. Although the eyepiece optical system disclosed in U.S. Pat. No. 5,305,147 reduces the number of lenses by employing the aspheric surfaces, the use of many aspheric lenses formed from glass materials with a refractive index is liable to make it difficult to manufacture this system.

Meanwhile, the eyepiece optical system disclosed in U.S. Patent Application Publication No. 2013/0188072 appropriately sets a ratio of a curvature of a lens surface located closest to the observation side to a lens effective diameter of this lens surface, thereby securing the long eye relief while achieving the small size and the high magnification. However, it is difficult to obtain the long eye relief if the curvature of a last lens surface is reduced in order to achieve the high magnification. On the other hand, an attempt to secure the long eye relief is likely to cause an increase in lens effective diameter and make the reduction in size of the entire system be difficult.

SUMMARY OF THE INVENTION

An eyepiece optical system of the present invention is an eyepiece optical system to observe an image displayed on an image display surface. The eyepiece optical system includes a first lens having a positive refractive power, a second lens having a negative refractive power, and a third lens having a positive refractive power, which are arranged in this order from an image display surface side to an observation side. In the eyepiece optical system, the following conditional expressions are satisfied:

$$0.450 \leq f1/f3 \leq 0.880; \text{ and}$$

$$0.160 < (L2R1 - L1R2)/(L2R1 + L1R2) \leq 0.294$$

where f1 represents a focal length of the first lens, f3 represents a focal length of the third lens, L1R2 represents a curvature radius of a lens surface on the observation side of the first lens, and L2R1 represents a curvature radius of a lens surface on the image display surface side of the second lens.

Further features of the present invention will become apparent from the following description of exemplary embodiments with reference to the attached drawings.

DESCRIPTION OF THE EMBODIMENTS

An eyepiece optical system and an observation apparatus according to examples will be described below. An eyepiece optical system of the present invention is an eyepiece optical system to observe an image displayed on an image display surface. The eyepiece optical system includes a first lens having a positive refractive power, a second lens having a negative refractive power, and a third lens having a positive refractive power, which are arranged in this order from the image display surface to an observation side. A fourth lens having a positive or negative refractive power may further be provided on the observation side of the third lens.

Figure 1:
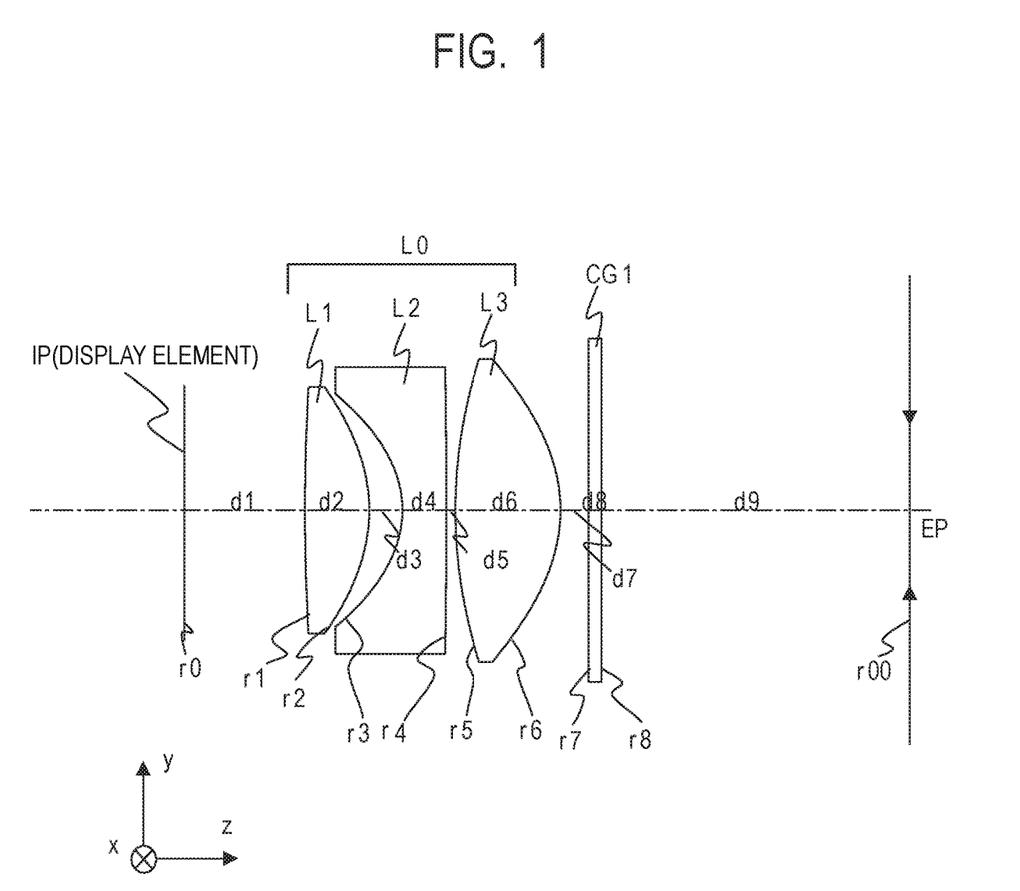
FIG. 1 is a lens cross-sectional view of an eyepiece optical system according to Example 1.
Figure 2:
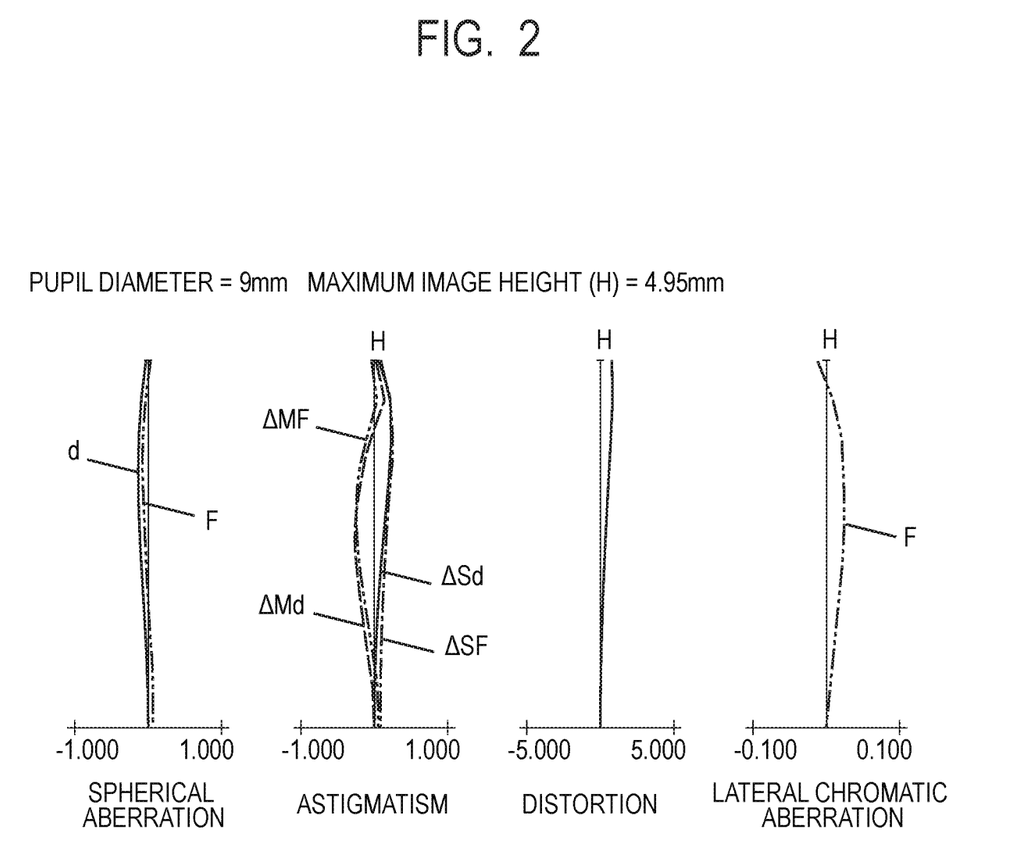
FIG. 2 shows aberration diagrams of the eyepiece optical system according to Example 1 at −1.0 diopter (standard diopter).

FIG. 1 is a lens cross-sectional view of an eyepiece optical system according to Example 1. FIG. 2 shows aberration diagrams of the eyepiece optical system according to Example 1 at −1.0 diopter (standard diopter).

Figure 3:
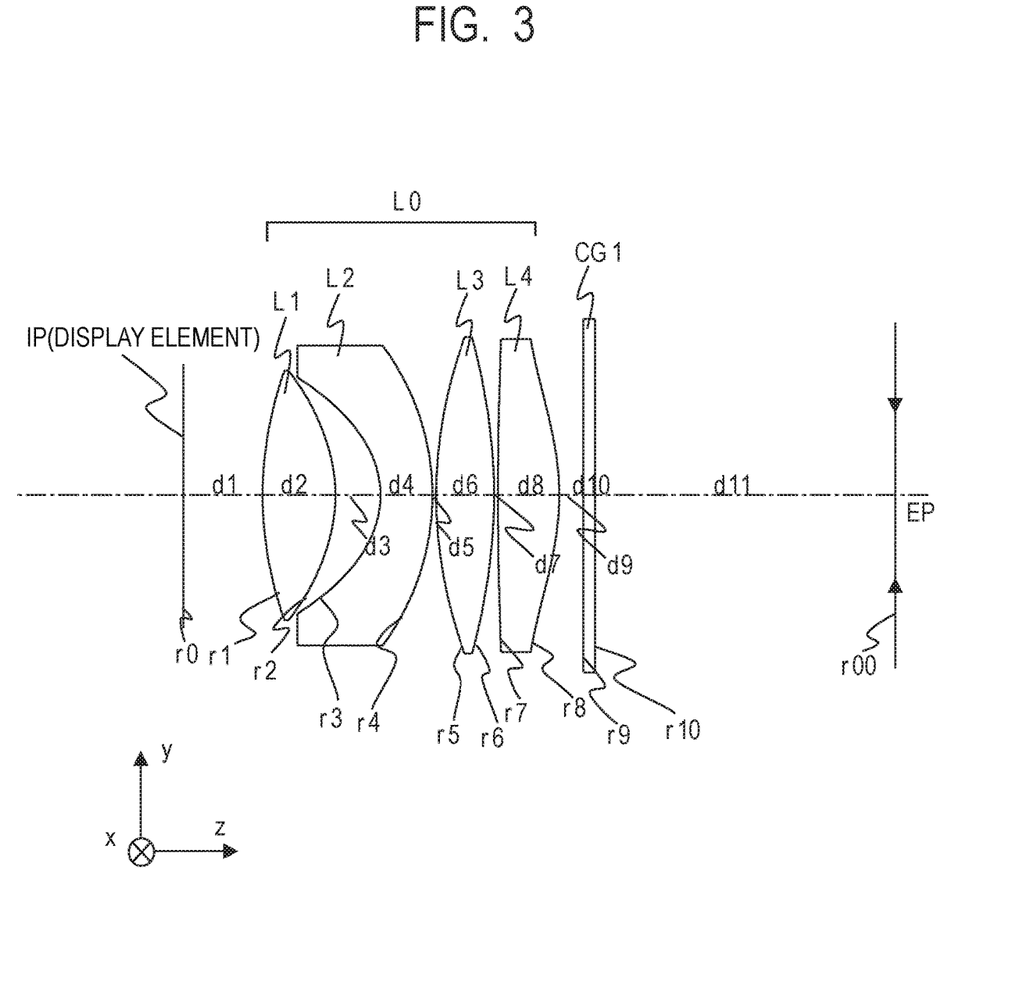
FIG. 3 is a lens cross-sectional view of an eyepiece optical system according to Example 2.
Figure 4:
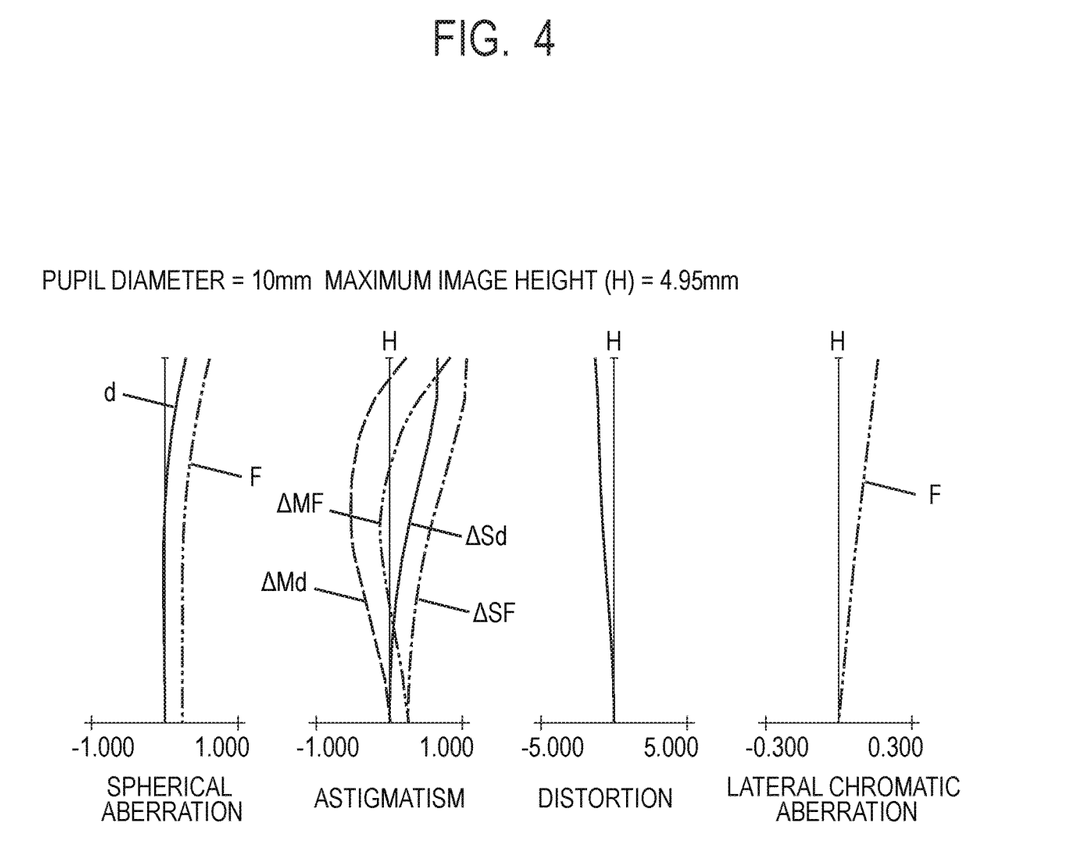
FIG. 4 shows aberration diagrams of the eyepiece optical system according to Example 2 at −1.0 diopter (the standard diopter).

FIG. 3 is a lens cross-sectional view of an eyepiece optical system according to Example 2. FIG. 4 shows aberration diagrams of the eyepiece optical system according to Example 2 at −1.0 diopter (the standard diopter).

Figure 5:
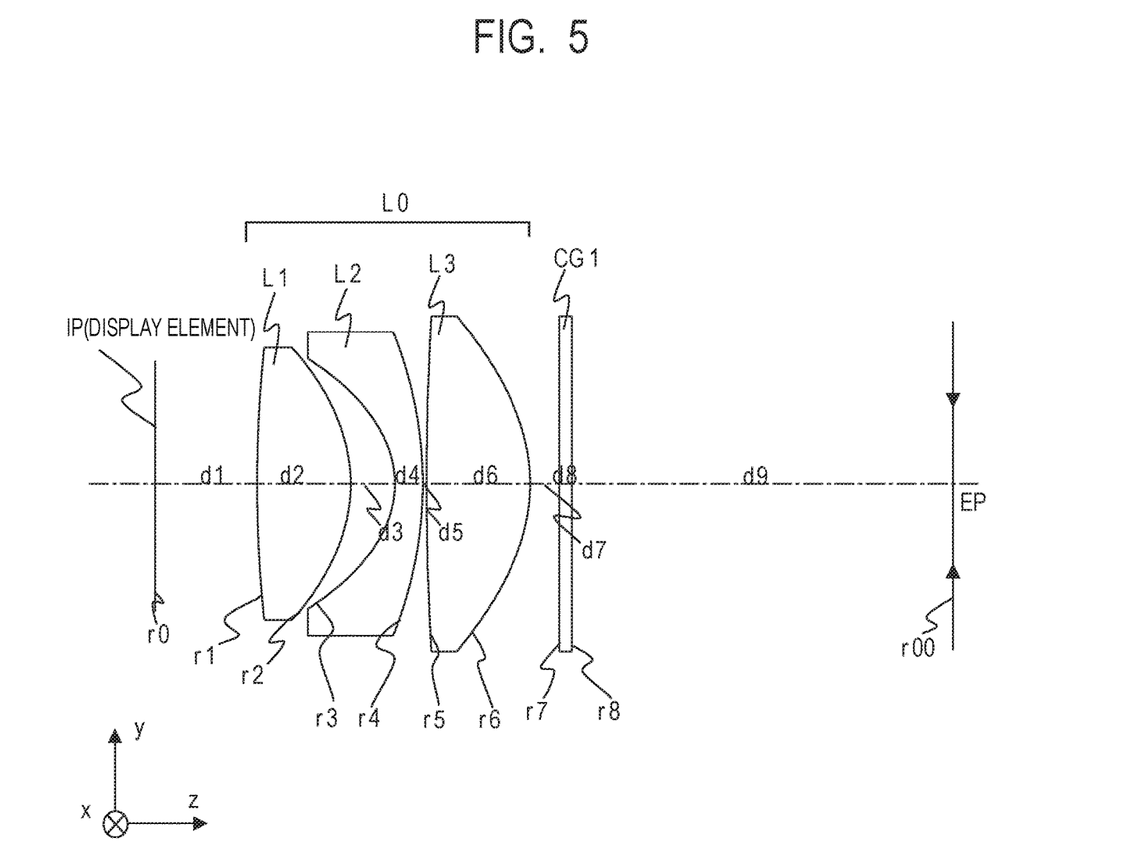
FIG. 5 is a lens cross-sectional view of an eyepiece optical system according to Example 3.
Figure 6:
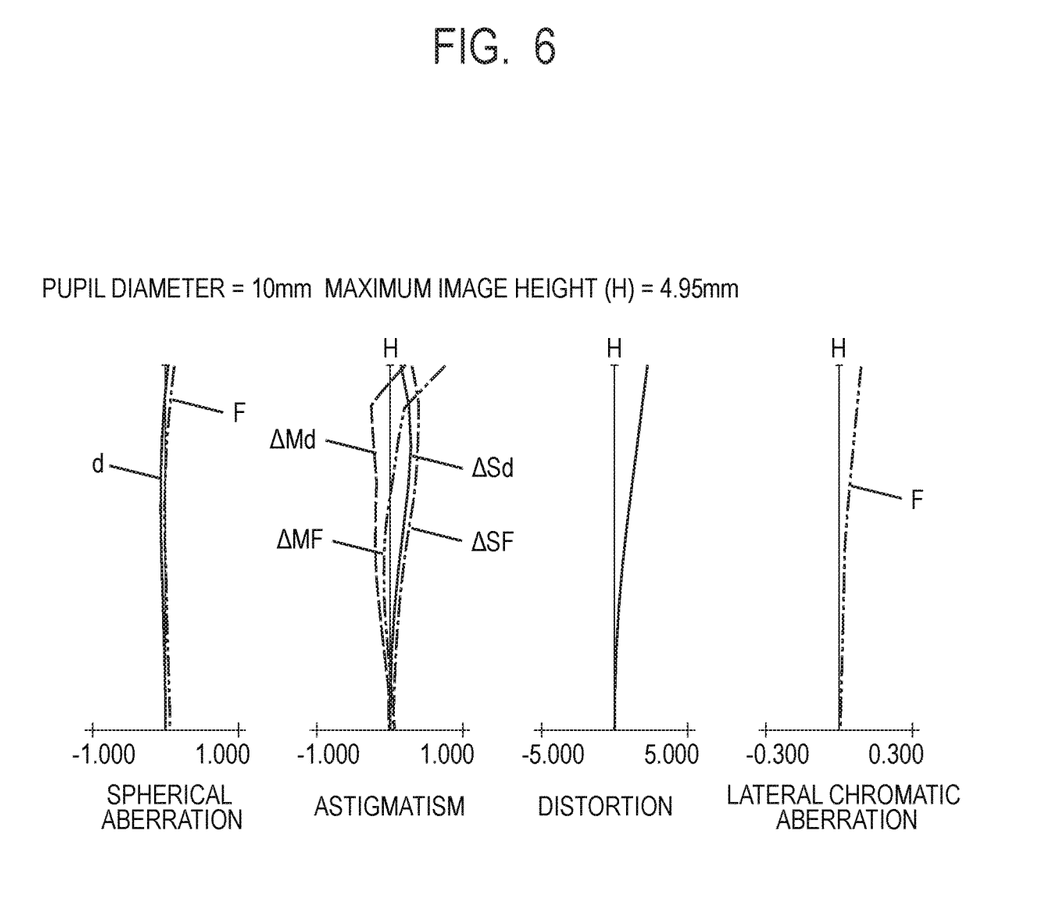
FIG. 6 shows aberration diagrams of the eyepiece optical system according to Example 3 at −1.0 diopter (the standard diopter).

FIG. 5 is a lens cross-sectional view of an eyepiece optical system according to Example 3. FIG. 6 shows aberration diagrams of the eyepiece optical system according to Example 3 at −1.0 diopter (the standard diopter).

Figure 7:
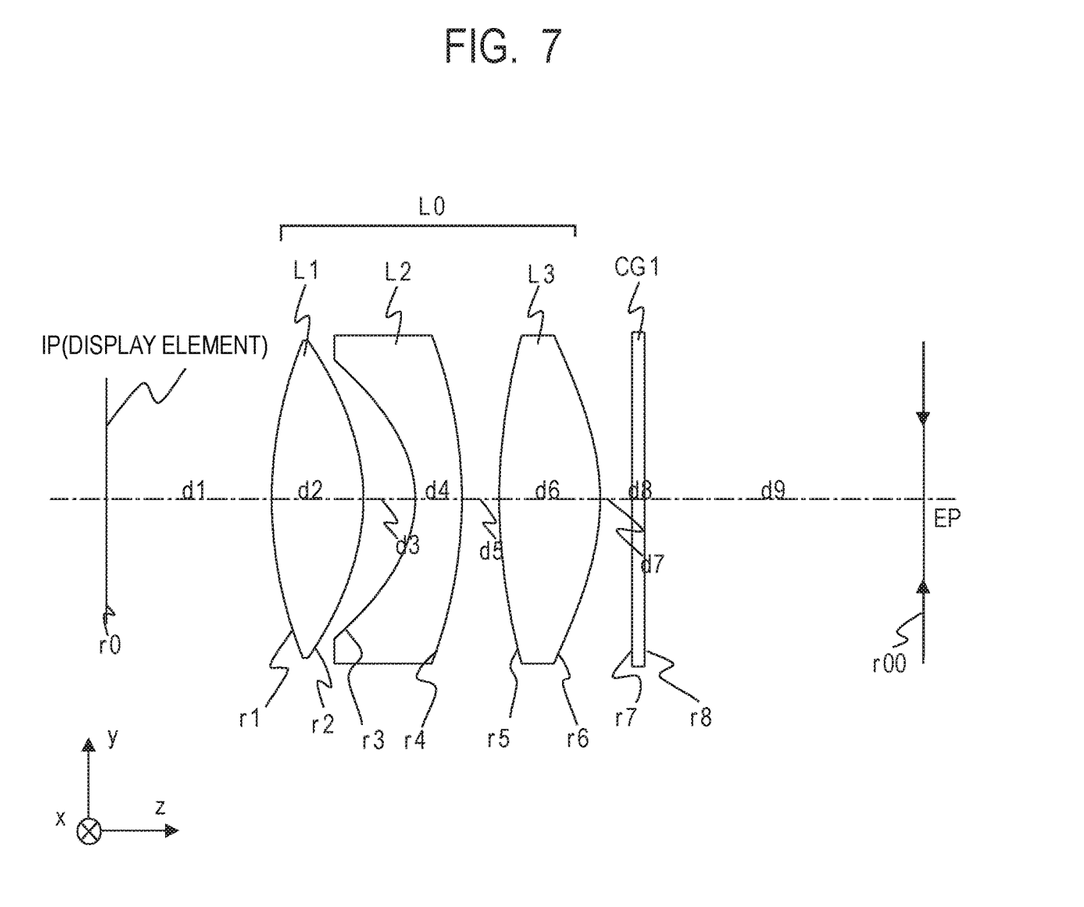
FIG. 7 is a lens cross-sectional view of an eyepiece optical system according to Example 4.
Figure 8:
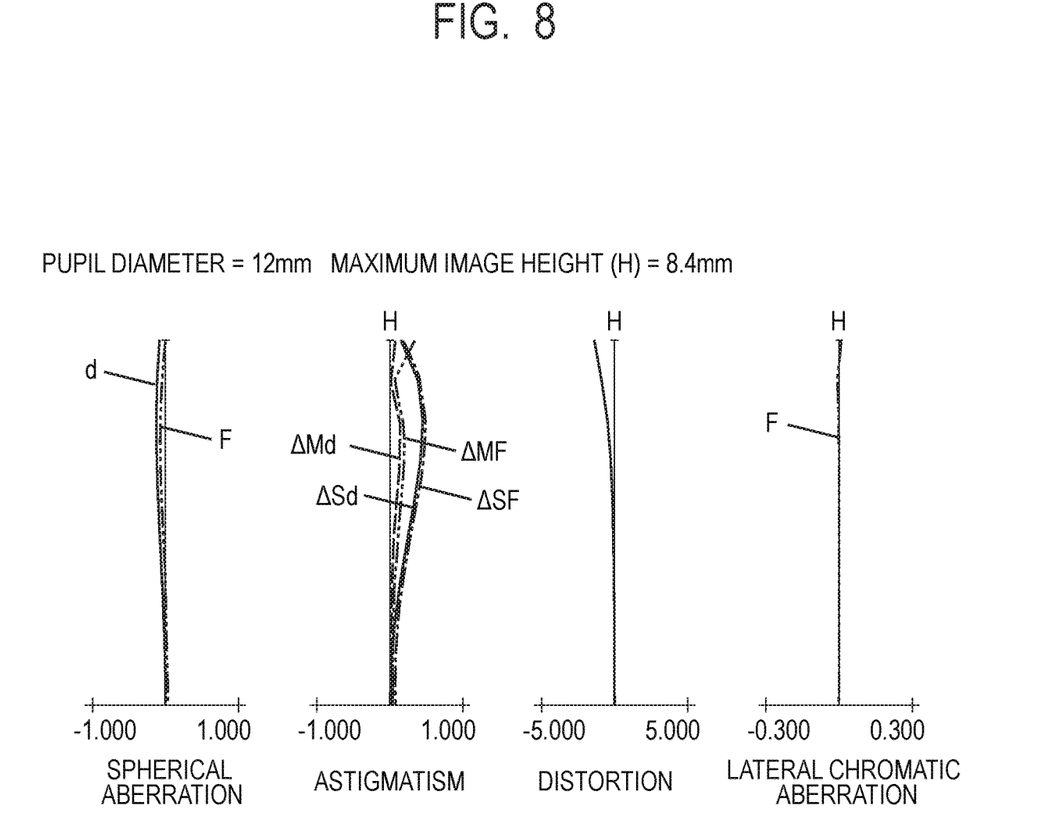
FIG. 8 shows aberration diagrams of the eyepiece optical system according to Example 4 at −1.0 diopter (the standard diopter).

FIG. 7 is a lens cross-sectional view of an eyepiece optical system according to Example 4. FIG. 8 shows aberration diagrams of the eyepiece optical system according to Example 4 at −1.0 diopter (the standard diopter).

Figure 9:
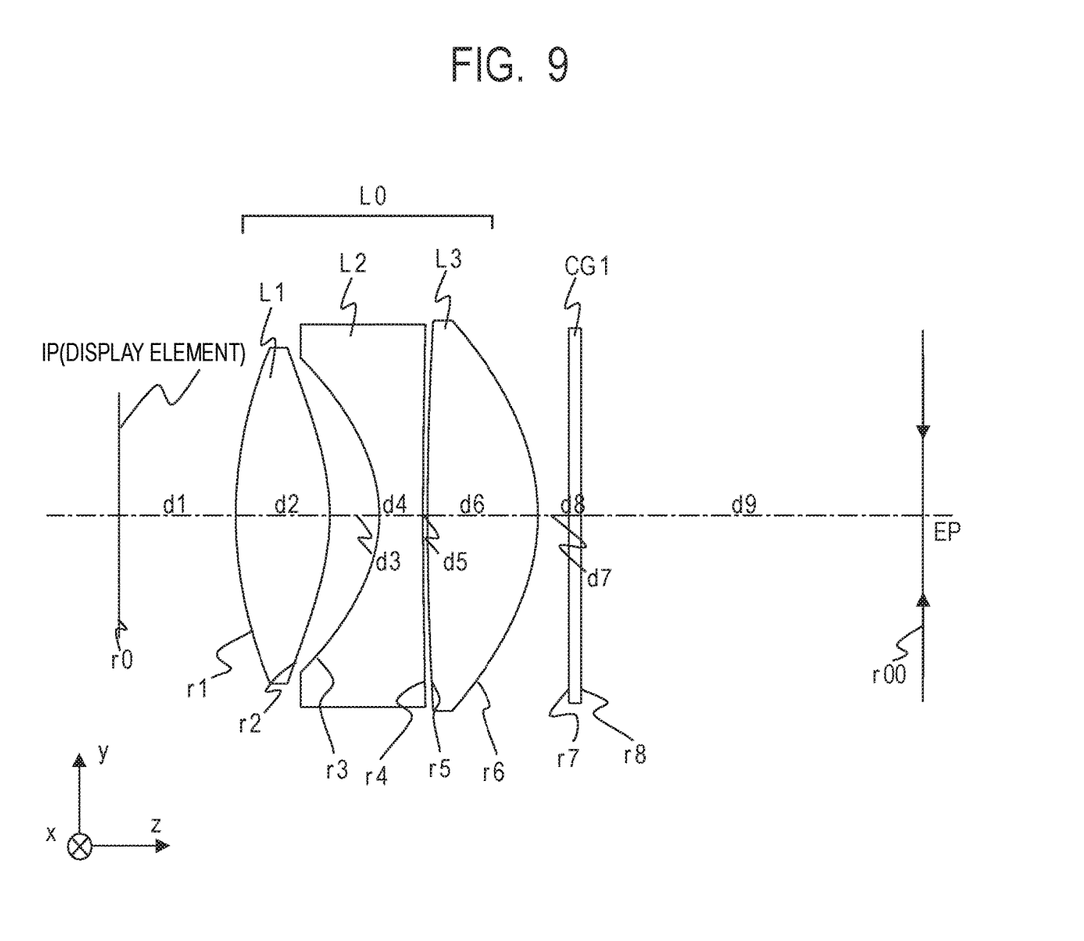
FIG. 9 is a lens cross-sectional view of an eyepiece optical system according to Example 5.
Figure 10:
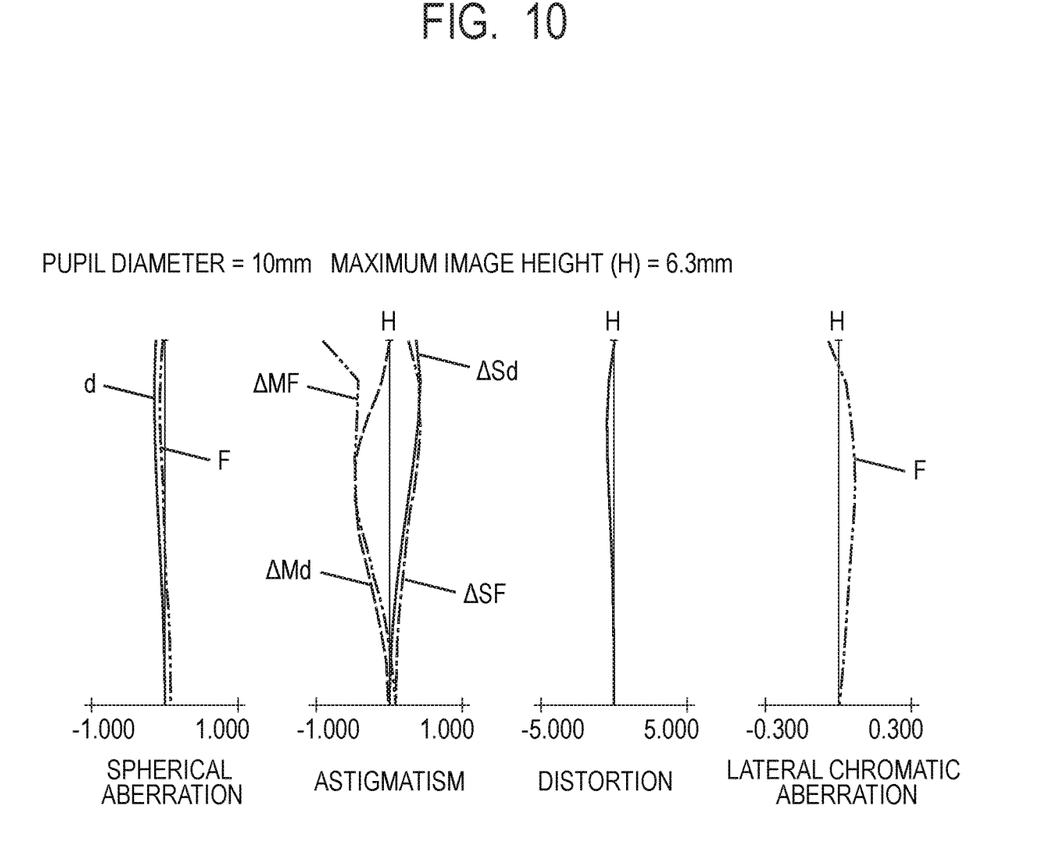
FIG. 10 shows aberration diagrams of the eyepiece optical system according to Example 5 at −1.0 diopter (the standard diopter).

FIG. 9 is a lens cross-sectional view of an eyepiece optical system according to Example 5. FIG. 10 shows aberration diagrams of the eyepiece optical system according to Example 5 at −1.0 diopter (the standard diopter).

Figure 11:
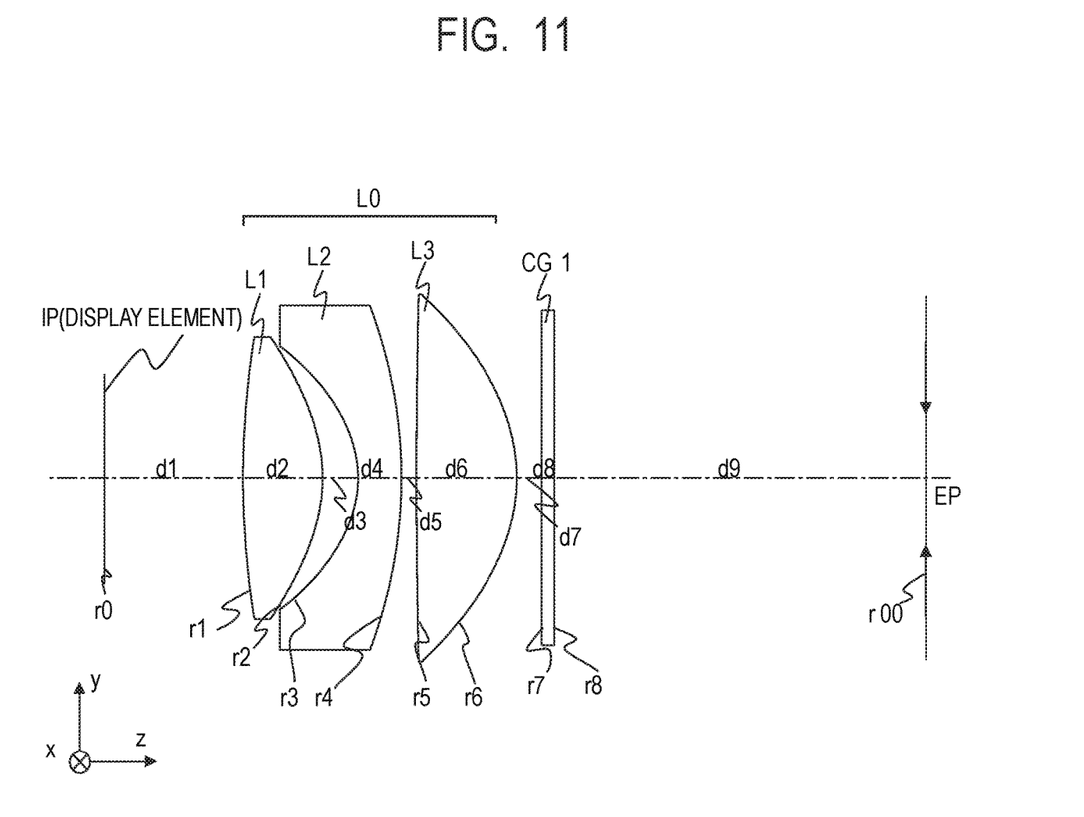
FIG. 11 is a lens cross-sectional view of an eyepiece optical system according to Example 6.
Figure 12:
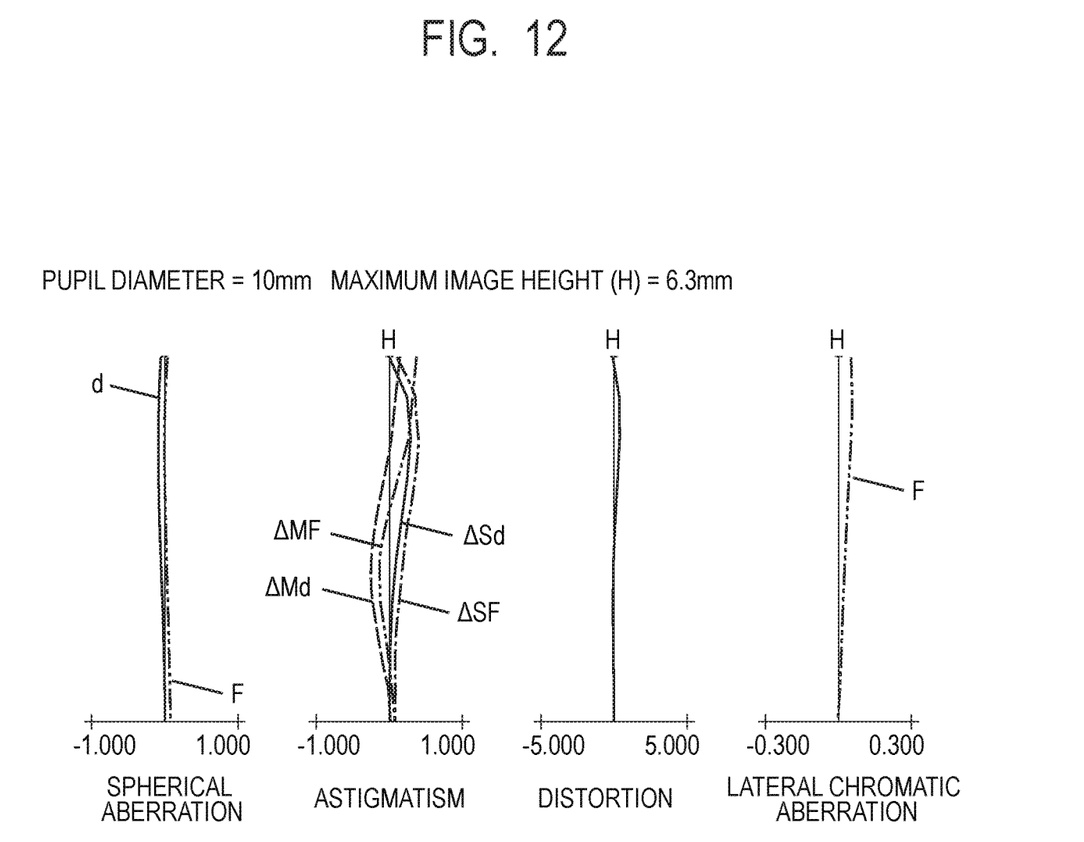
FIG. 12 shows aberration diagrams of the eyepiece optical system according to Example 6 at −1.0 diopter (the standard diopter).

FIG. 11 is a lens cross-sectional view of an eyepiece optical system according to Example 6. FIG. 12 shows aberration diagrams of the eyepiece optical system according to Example 6 at −1.0 diopter (the standard diopter).

The eyepiece optical system of each example is used for an electronic viewfinder (an observation apparatus) of an image pickup apparatus such as a digital camera and a video camera. In each lens cross-sectional view, the left side represents an image display surface side and the right side represents an observation side (an exit pupil side). In each lens cross-sectional diagram, reference sign L0 denotes the eyepiece optical system and reference sign Li denotes an i-th lens. Reference sign IP denotes an image display surface of an image display element formed from a liquid crystal display, an organic electroluminescence display, and the like. Reference sign EP denotes an observation surface (an eye point) (an exit pupil) for observation. Reference sign CG1 denotes a cover glass.

In each spherical aberration diagram among the aberration diagrams, a solid line with reference sign d represents the d-line (a wavelength of 587.6 nm) and a chain double-dashed line with reference sign F represents the F-line (a wavelength of 486.1 nm). In each astigmatism diagram, reference sign ΔSd (a solid line) represents the sagittal image plane of the d-line and reference sign ΔMd (a dashed line) represents the meridional image plane of the d-line. Meanwhile, reference sign ΔSF (a chain line) represents the sagittal image plane of the F-line and reference sign ΔMF (a chain double-dashed line) represents the meridional image plane of the F-line. Each distortion diagram is represented with respect to the d-line and each lateral chromatic aberration diagram is represented with respect to the F-line. Reference sign H is a half diagonal length (a maximum image height) of the image display surface. Each numerical value represents a below-mentioned value of numerical value data expressed in millimeter.

The eyepiece optical system is required to have a strong positive refractive power as a whole in order to enable observation of a small image display surface (a display panel), such as the image display surface of the image display element with a diagonal length of about 20 mm or less, at a large observation field of view (at a view angle of about 30 degrees or more). To this end, each of the lenses forming the eyepiece optical system needs to have either a strong positive refractive power or a negative refractive power. As a consequence, field curvatures and lateral chromatic aberrations are increased in many cases and these aberrations are hardly corrected.

In this regard, the eyepiece optical system according to each example is provided with three lenses arranged in the order from the image display surface IP side (an object side) to the observation surface (the eye point) EP side as shown in each lens cross-sectional view. Specifically, a first lens L1 having a positive refractive power, a second lens L2 having a negative refractive power, and a third lens L3 having a positive refractive power are provided therein. Meanwhile, a fourth lens L4 having a positive or negative refractive power may also be provided on the observation side of the third lens.

In each example, the observation surface EP may be moved in an optical axis direction as long as a light beam from the extreme periphery of the image display surface IP is caused to pass through the pupil of an observer. Meanwhile, a distance from a last lens surface (which is a lens surface on the observation side of the third lens L3 in each of FIGS. 1, 5, 7, 9, and 11 or a lens surface on the observation side of the fourth lens L4 in FIG. 3) to the observation surface EP will be defined as an eye relief. The cover glass is a plate for protecting the image display surface IP or the lenses. The cover glass may be provided between the image display surface IP to the nearest lens or between the observation surface EP and the nearest lens. Otherwise, the cover glass does not always have to be installed.

In each example, diopter correction is performed by moving the entire eyepiece optical system L0. The eyepiece optical system L0 of each example is an eyepiece optical system for observing an image displayed on the image display surface. The eyepiece optical system L0 includes the first lens L1 having the positive refractive power, the second lens L2 having the negative refractive power, and the third lens L3 having the positive refractive power, which are arranged in this order from the image display surface side to the observation side. A focal length of the first lens L1 is represented as f1, a focal length of the third lens L3 is represented as f3, a curvature radius of a lens surface on the observation side of the first lens L1 is represented as L1R2, and a curvature radius of a lens surface on the image display surface side of the second lens L2 is represented as L2R1.

Here, the following conditional expressions are satisfied:

$$0.450 \leq f1/f3 \leq 0.880 \qquad (1); \text{and}$$

$$0.160 < (L1R2-L2R1)/(L2R1+L1R2) \leq 0.294 \qquad (2).$$

Next, a description will be given of technical meanings of the respective conditional expressions mentioned above.

The conditional expression (1) defines a ratio of focal length between the first lens L1 and the third lens L3. If the ratio exceeds an upper limit value in the conditional expression (1), in other words, if the positive refractive force of the third lens L3 is too strong, it becomes easier to obtain a wide field of view but becomes difficult to secure the eye relief of a predetermined length. On the other hand, the refractive force of the first lens L1 is too strong if the ratio falls below a lower limit value in the conditional expression (1). In this case, a change in incidence height of a light beam from the first lens L1 that is incident on the second lens L2 is too large, thus leading to an increase in field curvature. This aberration is difficult to correct.

The conditional expression (2) defines a shape of an air lens to be formed between the first lens L1 and the second lens L2. The conditional expression (2) is provided for successfully correcting the field curvature while retaining a high magnification. In this configuration, the light beam emitted from the first lens L1 is bent outward with the second lens L2 in order to obtain the high magnification. If the ratio falls below a lower limit value in the conditional expression (2), the light beam is bent too steeply between the first lens L1 and the second lens L2. Thus, a correction of various aberrations or a correction of the field curvature in particular becomes difficult. On the other hand, if the ratio exceeds an upper limit value in the conditional expression (2), the outward bend of the light beam becomes insufficient and it becomes difficult to obtain the high magnification.

By satisfying the above-described configuration and conditional expressions, the eyepiece optical system according to each example of the present invention enables observation of the image on the image display surface at the high observation magnification and successful correction of the various aberrations, thereby securing high optical performances. In addition, it becomes easy to manufacture the eyepiece optical system according to each example.

It is preferable to set ranges of the numerical values in the conditional expressions (1) and (2) as shown below:

$$0.455 \leq f1/f3 \leq 0.870 \quad (1a); \text{ and}$$

$$0.165 < (L1R2-L2R1)/(L2R1+L1R2) \leq 0.290 \quad (2a)$$

It is more preferable to set the ranges of the numerical values in the conditional expressions (1a) and (2a) as shown below:

$$0.460 \leq f1/f3 \leq 0.855 \quad (1b); \text{ and}$$

$$0.170 < (L1R2-L2R1)/(L2R1+L1R2) \leq 0.285 \quad (2b).$$

The eyepiece optical system of each example preferably satisfies the following conditional expression. An interval on the optical axis between the first lens L1 and the second lens L2 (that is, an interval between the lens surface on the observation side of the first lens L1 and the lens surface on the image display surface side of the second lens L2) is represented as d3. Meanwhile, an interval on the optical axis between the second lens L2 and the third lens L3 (that is, an interval between the lens surface on the observation side of the second lens L2 and the lens surface on the image display surface side of the third lens L3) is represented as d5. Here, the eyepiece optical system preferably satisfies the following conditional expression:

$$0.00 \leq d5/d3 \leq 2.00 \quad (3).$$

The conditional expression (3) defines a ratio of the interval between the second lens L2 and the third lens L3 to the interval between the first lens L1 and the second lens L2. The conditional expression (3) is provided for successfully correcting the lateral chromatic aberration while obtaining a large view angle. If the ratio exceeds an upper limit value in the conditional expression (3), in other words, if the interval between the second lens L2 and the third lens L3 is too large, it becomes difficult to correct the lateral chromatic aberration. On the other hand, if the interval between the first lens L1 and the second lens L2 is too small, an incidence angle of the light beam incident on the second lens L2 becomes too steep whereby the field curvature is increased at a high point of an object height in particular.

If the ratio falls below a lower limit value in the conditional expression (3), the interval between the first lens L1 and the second lens L2 increases whereby the incidence height of the light beam incident on the second lens L2 is lowered. This makes it difficult to bend the light beam outward and to obtain the larger view angle.

It is preferable to set a range of the numerical value in the conditional expression (3) as shown below:

$$0.00 \leq d5/d3 \leq 1.50 \quad (3a).$$

It is more preferable to set the range of the numerical value in the conditional expression (3a) as shown below:

$$0.00 \leq d5/d \leq 1.00 \quad (3b).$$

In each example, the fourth lens having the positive or negative refractive power may be provided at the observation side of the third lens L3. In addition, the first lens L1 is preferably formed into a biconvex shape. The lens surface on the image display surface side of the second lens L2 is preferably formed into a concave shape. The third lens L3 is preferably formed into a biconvex shape. In this way, the correction of the various aberrations is facilitated and high optical performances are obtained easily.

Note that the "biconvex shape" means that the lens surface on the observation side has a shape that projects toward the observation side and the lens surface on the image display surface side has a shape that projects toward the image display surface side.

According to each example, the eyepiece optical system with the sufficiently wide view angle and the sufficient correction of the various aberrations including the field curvature and the lateral chromatic aberration is easily obtained as a consequence of satisfying the various conditions mentioned above. Meanwhile, in each example, an observation apparatus provided with the image display element to display an image and the eyepiece optical system used for observing the image displayed on the image display surface of the image display element preferably satisfies the following conditional expression.

A half diagonal length of the image display surface of the image display element is represented as PN. In this case, it is preferable to satisfy the following conditional expression:

$$0.25 < PN/f < 0.55 \quad (4).$$

The conditional expression (4) defines a ratio between the half diagonal length of an effective surface of the image display surface of the image display element and a focal length of the entire system. The conditional expression (4) is provided for securing the high magnification while retaining the eye relief at the predetermined length. If the ratio exceeds an upper limit value in the conditional expression (4), the focal length of the entire system is shortened. Though this is advantageous for achieving the higher magnification, it becomes difficult to secure high optical performances on the other hand. If the ratio falls below a lower limit value in the conditional expression (4), the refractive power of the entire system becomes weakened and it becomes difficult to secure the high magnification.

It is preferable to set a range of the numerical value in the conditional expression (4) as shown below:

$$0.25 < PN/f < 0.50 \quad (4a).$$

It is more preferable to set the range of the numerical value in the conditional expression (4a) as shown below:

$$0.25 < PN/f < 0.45 \quad (4b).$$

Numerical value data corresponding to the respective examples of the present invention will be shown below. In the numerical value data, reference sign ω denotes an apparent field of view (a half view angle) at −1 diopter (the standard diopter). Reference sign "ri" denotes an i-th surface counted in the order from the image display surface IP side to the observation surface EP side. Reference sign r0 denotes the display panel (the image display surface). In the sets of numerical value data 1 and 3 to 6, reference signs r7 and r8 represent the cover glass. Meanwhile, in the set of numerical value data 2, reference signs r9 and r10 represent the cover glass.

Reference sign di denotes an on-axis surface interval between an i−1-th surface and the i-th surface in the order from the image display surface IP. Furthermore, reference numeral Ndi denotes a refractive index of the material between the i-th surface and an i+1-th surface with respect to the d-line (the wavelength=587.6 nm), and reference sign vdi denotes the Abbe number of the material between the i-th surface and the i+1-th surface with respect to the d-line.

The numerical value data listed therein use [mm] as the unit of length unless otherwise specified. It is to be noted, however, that each eyepiece optical system can achieve the equivalent optical performances even when the system is proportionally enlarged or proportionally reduced. In this context, the unit is not necessarily limited to [mm] and other appropriate units can also be used. Note that a surface with a suffix "*" written in a column of a paraxial curvature radius in the numerical value data has an aspheric shape defined by the following expression.

$$x = \frac{h^2/R}{1 + \sqrt{1 - (1+k)(h/R)^2}} + c_2 h^2 + c_4 h^4 + c_6 h^6 + c_8 h^8$$

In this expression, reference sign x denotes a distance in the optical axis direction from an apex of a lens surface, reference sign h denotes a height in a direction perpendicular to the optical axis, reference sign R denotes the paraxial curvature radius at the apex of the lens surface, reference sign k denotes a conic constant, and reference signs c2, c4, c6, and c8 denote aspheric surface coefficients. In each aspheric surface coefficient, a suffix "E-i" represents a base-ten exponential notation, namely, "$10^{-i}$". Results of calculation of the respective conditional expressions mentioned above by using the respective numerical value data are shown in Table 1.

While the preferred examples of the present invention have been described above, it is to be understood that the present invention is not limited only to these examples and that various modifications and changes are possible within the scope of the gist of the invention.

[Numerical Value Data 1]

| Entire specification | | |
|---|---|---|
| Focal length | Diagonal length of image display surface | 2ω[degree] |
| 16.2 | 9.9 | 34.2 |

| Lens data | | | | |
|---|---|---|---|---|
| Surface | Paraxial curvature radius | On-axis surface interval | Refractive index (Nd) | Abbe number (vd) |
| r0 | (Display panel) d1 | Variable | | |
| r1 | 128.76 d2 | 3.97 | 1.851 | 40.1 |
| r2* | −10.20 d3 | 2.03 | | |
| r3* | −6.54 d4 | 2.70 | 1.636 | 23.9 |
| r4 | −600.00 d5 | 0.56 | | |
| r5 | 30.20 d6 | 6.50 | 1.535 | 55.7 |
| r6* | −9.87 d7 | Variable | | |
| r7 | 0.00 d8 | 0.80 | 1.492 | 57.4 |
| r8 | 0.00 d9 | 19.00 | | |
| EP | | | | |

| Aspheric surface coefficient | | | | |
|---|---|---|---|---|
| | k | C2 | C4 | C6 | C8 |
| r2* | 0.0 | 0.0 | 1.42E−04 | 8.96E−07 | 0.0 |
| r3* | −8.16E−01 | 0.0 | 2.75E−05 | 0.0 | 0.0 |
| r6* | −2.35E+00 | 0.0 | −1.54E−04 | 1.00E−06 | −2.10E−09 |

| Variable interval | | | | |
|---|---|---|---|---|
| Diopter [dpt] | 0 | −3 | +1 | −1 |
| d1 | 7.70 | 6.89 | 7.96 | 7.44 |
| d7 | 1.47 | 2.28 | 1.21 | 1.73 |

[Numerical Value Data 2]

| Entire specification | | |
|---|---|---|
| Focal length | Diagonal length of image display surface | 2ω[degree] |
| 14.7 | 9.9 | 36.6 |

| Lens data | | | | |
|---|---|---|---|---|
| Surface | Paraxial curvature radius | On-axis surface interval | Refractive index (Nd) | Abbe number (vd) |
| r0 | Display panel d1 | Variable | | |
| r1 | 22.07 d2 | 4.36 | 1.535 | 56.0 |
| r2* | −9.92 d3 | 2.70 | | |
| r3* | −5.72 d4 | 3.11 | 1.636 | 23.9 |
| r4 | −15.04 d5 | 0.22 | | |
| r5 | 26.99 d6 | 3.49 | 1.535 | 56.0 |
| r6 | −34.56 d7 | 0.23 | | |
| r7 | 230.09 d8 | 3.67 | 1.535 | 56.0 |
| r8* | −16.03 d9 | Variable | | |
| r9 | 0.00 d10 | 0.70 | 1.492 | 57.4 |
| r10 | 0.00 d11 | 18.00 | | |
| EP | | | | |

| Aspheric surface coefficient | | | | |
|---|---|---|---|---|
| | k | C2 | C4 | C6 | C8 |
| r2* | 0.0 | 0.0 | 1.91E−04 | 0.0 | 0.0 |
| r3* | −1.00E+00 | 0.0 | −2.29E−04 | 0.0 | 0.0 |
| r8* | 0.0 | 0.0 | 1.71E−04 | 0.0 | 0.0 |

-continued

Variable interval

| Diopter [dpt] | 0 | −3 | +1 | −1 |
|---|---|---|---|---|
| d1 | 5.01 | 4.33 | 5.22 | 4.79 |
| d9 | 1.23 | 1.90 | 1.01 | 1.45 |

[Numerical Value Data 3]

Entire specification

| Focal length | Diagonal length of image display surface | 2ω[degree] |
|---|---|---|
| 16.3 | 9.9 | 34.3 |

Lens data

| Surface | Paraxial curvature radius | On-axis surface interval | Refractive index (Nd) | Abbe number (vd) |
|---|---|---|---|---|
| r0 | Display panel d1 | Variable | | |
| r1 | 82.89 d2 | 5.93 | 1.694 | 53.2 |
| r2* | −10.11 d3 | 2.78 | | |
| r3* | −6.27 d4 | 1.75 | 1.636 | 23.9 |
| r4 | −25.61 d5 | 0.23 | | |
| r5 | 183.26 d6 | 6.56 | 1.694 | 53.2 |
| r6* | −11.34 d7 | Variable | | |
| r7 | 0.00 d8 | 0.80 | 1.492 | 57.4 |
| r8 | 0.00 d9 | 24.00 | | |
| EP | | | | |

Aspheric surface coefficient

| | k | C2 | C4 | C6 | C8 |
|---|---|---|---|---|---|
| r2* | 0.0 | 0.0 | 1.10E−04 | 1.16E−06 | 0.0 |
| r3* | −1.14E+00 | 0.0 | −1.94E−04 | 1.08E−06 | −1.73E−08 |
| r6* | −9.43E−01 | 0.0 | 2.66E−05 | 4.53E−08 | −1.71E−10 |

Variable interval

| Diopter [dpt] | 0 | −3 | +1 | −1 |
|---|---|---|---|---|
| d1 | 6.72 | 5.89 | 6.98 | 6.45 |
| d7 | 1.57 | 2.40 | 1.31 | 1.83 |

[Numerical Value Data 4]

Entire specification

| Focal length | Diagonal length of image display surface | 2ω[degree] |
|---|---|---|
| 23.8 | 16.8 | 38.1 |

Lens data

| Surface | Paraxial curvature radius | On-axis surface interval | Refractive index (Nd) | Abbe number (vd) |
|---|---|---|---|---|
| r0 | Display panel d1 | Variable | | |
| r1 | 27.08 d2 | 5.91 | 1.532 | 55.8 |
| r2* | −13.65 d3 | 3.33 | | |
| r3* | −7.62 d4 | 3.00 | 1.636 | 23.9 |
| r4 | −29.81 d5 | 2.44 | | |
| r5 | 39.56 d6 | 6.50 | 1.532 | 55.8 |
| r6* | −15.35 d7 | Variable | | |
| r7 | 0.00 d8 | 0.80 | 1.492 | 57.4 |
| r8 | 0.00 d9 | 18.00 | | |
| EP | | | | |

Aspheric surface coefficient

| | k | C2 | C4 | C6 | C8 |
|---|---|---|---|---|---|
| r2* | 0.0 | 0.0 | 9.51E−05 | 0.0 | 0.0 |
| r3* | −7.21E−01 | 0.0 | 8.62E−05 | 3.50E−07 | 0.0 |
| r6* | 0.0 | 0.0 | 8.99E−05 | 9.10E−08 | 0.0 |

Variable interval

| Diopter [dpt] | 0 | −3 | +1 | −1 |
|---|---|---|---|---|
| d1 | 11.17 | 9.43 | 11.73 | 10.59 |
| d7 | 1.47 | 3.21 | 0.91 | 2.05 |

[Numerical Value Data 5]

Entire specification

| Focal length | Diagonal length of image display surface | 2ω[degree] |
|---|---|---|
| 16.3 | 12.6 | 41.6 |

Lens data

| Surface | Paraxial curvature radius | On-axis surface interval | Refractive index (Nd) | Abbe number (vd) |
|---|---|---|---|---|
| r0 | Display panel d1 | Variable | | |
| r1 | 27.29 d2 | 6.08 | 1.851 | 40.1 |
| r2* | −15.21 d3 | 3.19 | | |
| r3* | −9.53 d4 | 2.80 | 1.651 | 21.5 |
| r4 | 477.19 d5 | 0.30 | | |
| r5 | 220.12 d6 | 7.13 | 1.768 | 49.2 |
| r6* | −13.95 d7 | Variable | | |
| r7 | 0.00 d8 | 0.80 | 1.492 | 57.4 |
| r8 | 0.00 d9 | 22.00 | | |
| EP | | | | |

Aspheric surface coefficient

| | k | C2 | C4 | C6 | C8 |
|---|---|---|---|---|---|
| r2* | 0.0 | 0.0 | 1.31E−04 | 0.0 | 0.0 |
| r3* | −2.04E+00 | 0.0 | −6.75E−05 | 0.0 | 0.0 |
| r6* | −1.98E+00 | 0.0 | −3.38E−05 | 4.01E−08 | 0.0 |

Variable interval

| Diopter [dpt] | 0 | −3 | +1 | −1 |
|---|---|---|---|---|
| d1 | 7.75 | 6.91 | 8.01 | 7.49 |
| d7 | 1.72 | 2.57 | 1.46 | 1.99 |

[Numerical Value Data 6]

Entire specification

| Focal length | Diagonal length of image display surface | 2ω[degree] |
|---|---|---|
| 18.7 | 12.6 | 36.8 |

Lens data

| Surface | Paraxial curvature radius | On-axis surface interval | Refractive index (Nd) | Abbe number (vd) |
|---|---|---|---|---|
| r0 | Display panel d1 | Variable | | |
| r1 | 57.01 d2 | 5.17 | 1.694 | 53.2 |
| r2* | −10.79 d3 | 2.28 | | |
| r3* | −7.39 d4 | 2.80 | 1.636 | 23.9 |
| r4 | −31.15 d5 | 0.96 | | |

-continued

| | | | | | |
|---|---|---|---|---|---|
| r5 | 489.04 | d6 | 6.50 | 1.532 | 55.8 |
| r6* | −11.46 | d7 | Variable | | |
| r7 | 0.00 | d8 | 0.80 | 1.492 | 57.4 |
| r8 | 0.00 | d9 | 24.00 | | |
| EP | | | | | |

Aspheric surface coefficient

| | k | C2 | C4 | C6 | C8 |
|---|---|---|---|---|---|
| r2* | −2.04E+00 | 0.0 | −8.12E−06 | 0.0 | 0.0 |
| r3* | −1.06E+00 | 0.0 | 3.60E−05 | −1.20E−06 | 0.0 |
| r6* | −1.84E+00 | 0.0 | −6.06E−05 | 5.62E−08 | 0.0 |

Variable interval

| Diopter [dpt] | 0 | −3 | +1 | −1 |
|---|---|---|---|---|
| d1 | 9.14 | 8.05 | 9.48 | 8.79 |
| d7 | 1.26 | 2.35 | 0.91 | 1.61 |

TABLE 1

| Conditional expression | Numerical value data | | | | | |
|---|---|---|---|---|---|---|
| | 1 | 2 | 3 | 4 | 5 | 6 |
| (1) | 0.763 | 0.465 | 0.854 | 0.829 | 0.710 | 0.638 |
| (2) | 0.219 | 0.269 | 0.234 | 0.283 | 0.230 | 0.234 |
| (3) | 0.273 | 0.080 | 0.083 | 0.731 | 0.093 | 0.419 |
| (4) | 0.306 | 0.337 | 0.304 | 0.353 | 0.386 | 0.338 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-231519, filed Dec. 1, 2017 which is hereby incorporated by reference herein in its entirety.

What is claimed is:

1. An eyepiece optical system for observing an image displayed on an image display surface, the eyepiece optical system comprising:
   a first lens having a positive refractive power, a second lens having a negative refractive power, and a third lens having a positive refractive power arranged in this order from an image display surface side to an observation side,
   wherein the second lens has a meniscus shape with a concave surface on the image display surface side,
   wherein the third lens has a biconvex shape, and
   wherein the following conditional expressions are satisfied:

$0.450 \leq f1/f3 \leq 0.880$; and $0.160 < (L1R2 - L2R1)/(L2R1 + L1R2) \leq 0.294$ where f1 represents a focal length of the first lens, f3 represents a focal length of the third lens, L1R2 represents a curvature radius of a lens surface on the observation side of the first lens, and L2R1 represents a curvature radius of a lens surface on the image display surface side of the second lens.

2. The eyepiece optical system according to claim 1, wherein the following conditional expression is satisfied:

$0.00 \leq d5/d3 \leq 2.00$ where d3 represents an interval on an optical axis between the first lens and the second lens and d5 represents an interval on the optical axis between the second lens and the third lens.

3. The eyepiece optical system according to claim 1, further comprising:
   a fourth lens having a positive or negative refractive power and being arranged on the observation side of the third lens.

4. The eyepiece optical system according to claim 1, wherein the first lens has a biconvex shape.

5. The eyepiece optical system according to claim 1, wherein the second lens is disposed adjacent to the observation side of the first lens and the third lens is disposed adjacent to the observation side of the second lens.

6. An observation apparatus comprising:
   an image display element configured to display an image; and
   an eyepiece optical system used to observe the image displayed on an image display surface of the image display element,
   wherein the eyepiece optical system includes a first lens having a positive refractive power, a second lens having a negative refractive power, and a third lens having a positive refractive power arranged in this order from an image display surface side to an observation side,
   wherein the second lens has a meniscus shape with a concave surface on the image display surface side,
   wherein the third lens has a biconvex shape, and
   wherein the following conditional expressions are satisfied:

$0.450 \leq f1/f3 \leq 0.880$; and $0.160 < (L1R2 - L2R1)/(L2R1 + L1R2) \leq 0.294$ where f1 represents a focal length of the first lens, f3 represents a focal length of the third lens, L1R2 represents a curvature radius of a lens surface on the observation side of the first lens, and L2R1 represents a curvature radius of a lens surface facing on the image display surface side of the second lens.

7. The observation apparatus according to claim 6, wherein the following conditional expression is satisfied:

$0.25 < PN/f < 0.55$ where PN represents a half diagonal length of the image display surface of the image display element.

8. An observation apparatus comprising:
   an image display element configured to display an image; and
   an eyepiece optical system used to observe the image displayed on an image display surface of the image display element,
   wherein the eyepiece optical system includes a first lens having a positive refractive power, a second lens having a negative refractive power, and a third lens having a positive refractive power arranged in this order from an image display surface side to an observation side, and
   wherein the following conditional expressions are satisfied:

$0.450 \leq f1/f3 \leq 0.880$;

$0.160 < (L1R2 - L2R1)/(L2R1 + L1R2) \leq 0.294$; and $0.25 < PN/f < 0.55$ where f1 represents a focal length of the first lens, f3 represents a focal length of the third lens, L1R2 represents a curvature radius of a lens surface on the observation side of the first lens, L2R1 represents a curvature radius of a lens surface facing on the image display surface side of the second lens, and PN represents a half diagonal length of the image display surface of the image display element.

* * * * *